(12) United States Patent
Gunreben et al.

(10) Patent No.: US 6,944,463 B2
(45) Date of Patent: Sep. 13, 2005

(54) METHOD FOR COMMUNICATION TRAFFIC LOAD BALANCING BETWEEN CELLS OF A COMMUNICATION SYSTEM

(75) Inventors: Peter Christian Gunreben, Bavaria (DE); Enrico Jugl, Bavaria (DE); Holger Pampel, Bavaria (DE)

(73) Assignee: Lucent Technologies Inc., Murray Hill, NJ (US)

( * ) Notice: Subject to any disclaimer, the term of this patent is extended or adjusted under 35 U.S.C. 154(b) by 404 days.

(21) Appl. No.: 10/366,786

(22) Filed: Feb. 14, 2003

(65) Prior Publication Data

US 2003/0153315 A1 Aug. 14, 2003

(30) Foreign Application Priority Data

Feb. 14, 2002 (EP) .............................. 02251015

(51) Int. Cl.[7] .......................... H04Q 7/20; H04B 17/00
(52) U.S. Cl. .................... 455/453; 455/446; 455/67.11; 455/424
(58) Field of Search ................................. 455/453, 445, 455/446, 450, 451, 452.1, 423, 424, 67.11, 452.2

(56) References Cited

U.S. PATENT DOCUMENTS

| | | | |
|---|---|---|---|
| 5,241,686 A | 8/1993 | Charbonnier | ............... 455/33.2 |
| 6,044,249 A | 3/2000 | Chandra et al. | ............... 455/62 |
| 6,069,871 A | 5/2000 | Sharma et al. | ............... 370/209 |
| 6,308,071 B1 * | 10/2001 | Kalev | ......................... 455/446 |
| 6,459,894 B1 * | 10/2002 | Phillips et al. | ............... 455/424 |

FOREIGN PATENT DOCUMENTS

| | | | |
|---|---|---|---|
| EP | 0 505 341 A2 | 3/1999 | ............ H04Q/7/04 |
| WO | WO 00/74427 A1 | 12/2000 | ............ H04Q/7/38 |

OTHER PUBLICATIONS

Wigard, J. et al: "On a Handover Algorithm in a PCS1900/GSM/DCS1800 Network", Vehicular Technology Conference, 1999 IEEE 49th Houston, TX, U.S.A., IEEE, U.S.A., May 16–20, 1999, Piscataway, NJ U.S.A., IEEE, U.S.A. (May 16, 1999), pp. 2510–2514, XP010342283, ISBN: 0–7803–5565–2.

* cited by examiner

*Primary Examiner*—Sonny Trinh
*Assistant Examiner*—Un C Cho

(57) ABSTRACT

A method is proposed for communication traffic load balancing between cells of a communication system which are differently loaded. An evaluation factor is determined by a predefined mapping function for each of a home cell k and at least one other cell l, each evaluation factor being a measure of the load on the respective cells. At least one comparing factor is determined with respect to the home cell evaluation factor by comparing the evaluation factor of the home cell with those of the at least one further cells. Each of the comparing factors has a corresponding traffic load penalty factor. The traffic load penalty factors are a measure of load difference and/or transmission quality between the cells. This assignment is repeated in a loop such that current traffic load penalty factors are determined depending on predefined traffic load penalty factors and/or forerunner traffic load penalty factors determined in earlier cycles of the loop. The current traffic load penalty factors are used to evaluate unused transmission capacity of a cell and/or cells in comparison to the home cell and/or a time at which at least a part of the traffic of the home cell is handed over to at least one cell with unused capacity.

10 Claims, 3 Drawing Sheets

METHOD FOR COMMUNICATION TRAFFIC LOAD BALANCING BETWEEN CELLS OF A COMMUNICATION SYSTEM

CROSS REFERENCE TO RELATED APPLICATION

This application claims priority of European Application No. 02251015.0 filed on Feb. 14, 2002.

FIELD OF THE INVENTION

The invention relates to balancing traffic load between cells of a communication system.

BACKGROUND OF INVENTION

Methods and apparatus are known in the art which are used to cope with the problem of limited resources on the one hand and the increased number of mobile subscribers on the other. To overcome this problem different solutions are imaginable. These can be roughly classified in hardware solutions, improved channel allocation schemes and the change of handover boundary parameters.

Of course digital hardware i.e. resources and channels or cells, respectively can be installed at locations where the network is expected to become overloaded. Yet, additional channels need to allocate new bandwidth which is not available for most of the operators. Moreover, additional cells require new locations, which are either not possible to acquire or are very expensive to install. Both methods do not exploit the unused capacity in lightly loaded cells. Another hardware solution could be to employ adaptive antennas for a dynamic distribution of the traffic. Furthermore, the problem of unbalanced traffic could be solved if modern relay technologies were integrated in the cellular infrastructure. However, the latter method is even more cost effective than installing additional base stations for additional cells.

Moreover, dynamic channel allocations schemes are proposed which are capable of adapting the network to changing load situations. Contrary to the fixed channel allocation, which is mostly used in today's mobile communication systems, the new methods are based on the provisioning of a pool of available channels which are dynamically exposed and assigned to the cells. Thus, in highly loaded cells more channels can be assigned than in lightly loaded cells. However, additional channels are quite expensive and the method implies a heavy control function.

Since the traffic load tends to vary during the day, e.g. according to rush-hours, many cells in the cellular network are loaded differently over time. However, some cells will temporarily enter a congested state while other cells have only a low load. On the one hand, the highly loaded cells operate at a high blocking probability, which corresponds to the local capacity limit. On the other hand, the low loaded neighboring cells have some unused capacity, which conventionally can not be exploited to absorb traffic of the highly loaded cells. Therefore, there is some room for improving the system capacity by equalizing the cell load all over the network by exploiting the cell capacity in lightly loaded cells. The problem can be observed in a microcellular environment as well. Especially, as the cell size gets smaller the unequal distribution of the subscribers becomes very likely.

One possibility to equalize the cell load addresses the dynamic adaptation of handovers. The dynamic adjustment of the handover boundaries is a very simple method for increasing the overall capacity of the network without the necessity of adding new resources.

There are already state of the art proposals in place to equalize the cell load. Yet, these methods usually use only the current load situation for deciding whether or not a call is to be directed to a neighbor cell. However, if the load situation is completely different in the next time interval (when the load situation is updated), the cell borders are immediately shifted back. This effect leads to rapid variations of the cell boundary. Thus, it becomes probable that a lot of unnecessary or ping-pong handovers occur, increasing the signaling load on the base station controllers. As there is always a certain probability for handover failures, the overall network performance will be degraded due to the increased number of handovers. Since the increased number of handovers increases the signaling load on the network and degrades the speech quality, it is obvious that the method deciding on handovers plays a key role in modern communication systems.

Therefore, it is in particular an object of the present invention to provide a method for improved load balancing between cells in combination with an improved handover strategy.

SUMMARY OF THE INVENTION

A method is proposed for communication traffic load balancing between cells of a communication system which are loaded differently. An evaluation factor is determined by a predefined mapping function for each of a home cell k and for at least one other cell l. An evaluation factor is a measure of the load on the cell. At least one comparing factor is determined with respect to the home cell evaluation factor by comparing the evaluation factor of the home cell with those of the at least one other cell. Each of the comparing factors are assigned to corresponding traffic load penalty factors, the traffic load penalty factors being a measure of load difference and/or transmission quality between the cells. The assignment is repeated in a loop wherein current traffic load penalty factors are determined depending on predefined traffic load penalty factors and/or forerunner traffic load penalty factors determined in earlier cycles of the loop, whereby a cell and/or cells is evaluated in comparison to the home cell with regard to unused transmission capacity and/or a time at which at least a part of the traffic of the home cell is to be handed over to at least one cell with unused capacity.

As stated, the evaluation process step is made based on the load penalty factor, however, this does not mean that the evaluation has to be done exclusively by the current traffic load penalty factors, but should include the case that other parameters in connection with the determined current traffic load penalty factors are taken into account in the evaluation process.

One major advantage of the invention is that the current traffic load penalty factors are determined depending on those which have been calculated previously in the defined loop. This provides the positive effect that handovers are achieved in a more controlled way, i.e. the proposed method leads to a smoother change of the cell borders in contrast to other algorithms which often overreact. This way, a too rapid variation of the cell size can be prevented.

A further advantage of the invention is that the mapping function preferably maps the free traffic resources into an evaluation factor. This is done particularly in terms of free traffic channels, whereby the mapping function is supposed to be a discrete and monotonic decreasing function. Thus a small number of free channels correspond to a high evaluation factor.

A possible solution to determine the evaluation factor is to classify the current number of free channels $N_{ch}$ into one of n bands, whereby each band specifies a predefined evaluation factor $C_i$. The bands are defined by a set of load thresholds $L_1 \ldots L_{n-1}$ representing the maximum number of free traffic channels for the corresponding band. The load thresholds and the evaluation factors must fulfill the following conditions:

$$[L_1, L_2, \ldots, L_{n-1}]; \ 0 \leq L_1 \leq L_2 \leq \ldots \leq L_{n-1}$$

$$[C_1, C_2, \ldots, C_{n-1}]; \ C_1 \geq C_2 \geq \ldots \geq C_{n-1} \geq 0,$$

where $C_n$ is usually set to zero and $L_0=0$. From the obtained set of evaluation factors, the evaluation factor C is chosen or selectively mapped which reflects best the current free channels situation. The evaluation factor C can be determined in the following way $$C = \{C_i | L_{i-1} \leq N_{free} < L_i\}, \ i = 1 \ldots n.$$

Most advantageously, the invention provides a defined assignment which allows a simple way to determine the above described bands of free traffic channels and the corresponding evaluation factors automatically. Thus, the inventors show that the following terms are able to express the inventive concept:

$$L_i = \left[(1 - S_{load}/100) \cdot \frac{i}{n-i}\right] \cdot N_{ch}, \ \text{with } 1 \leq i \leq n-1,$$

$$C_i = \left[(C_{max} - 0.1) \cdot \left(\frac{n-i}{n-1}\right)^a + 0.1\right], \ \text{with } 1 \leq i \leq n-1,$$

where the variables have the following meaning:

| Variable | Meaning |
| --- | --- |
| $L_i$ | load threshold, i. e. maximum number of free traffic channels for the corresponding band i |
| I | band index |
| N | number of bands |
| $S_{load}$ | percentage of traffic load at which the load balancing should start |
| $N_{ch}$ | the total number of traffic channels |
| $C_i$ | evaluation factor for band i |
| $C_{max}$ | maximum evaluation faction |
| A | parameter which determines the rise of the evaluation factor |

Even more advantageously the inventive current traffic load penalty factors can be determined by the following recurrence formula:

$$TL\_penalty_n(k,l) = [TL\_penalty_{n-1}(k,l) + C(k) - C(l)] \cdot lbf$$

wherein lbf is the load balancing factor which is in the interval [0, 1]. This relation enables the determination of a current traffic load penalty factor in the inventive loop, whereby the current traffic load penalty is determined by summing up its forerunner and the comparing factors, thus avoiding changing of the current traffic load penalty factors too fast upon the evaluated comparing factors. The same applies for the stated load balancing factor which is appropriately adapted. Highly advantageous, the inventive method works somewhat like an automatic control loop for stabilizing the handover process.

In a further aspect of the present invention, it is positively provided that the current traffic load penalty factor is restricted to certain limits. Thus, advantageously, the current traffic load penalty factor is prevented from reaching very high values within long overload situations. The following term provides a possibility to define the limits:

$$TL\_penalty_n(k,l) = \begin{cases} TL\_penalty\_limit & \text{for } TL\_penalty_n(k,l) > TL\_penalty\_limit \\ TL\_penalty\_limit & \text{for } TL\_penalty_n(k,l) < -TL\_penalty\_limit \end{cases}$$

With respect to the present invention, the inventors were able to show that the inventive current traffic load penalty factor could be favorably applied in connection with a power budget being well known in the state of the art and which is based on the difference of the receipt level at the mobile station between the current base station and its neighbor base station. By adding the current penalty factor to the normal power budget, the process of power budget handover can be modified to support the load balancing function. Present mobile communication systems already use the power budget as a measure for handover evaluations and decisions, particularly for inter-cell handovers.

The invention is not restricted to a method but also comprises an apparatus which is in particular adapted to carry out the inventive method.

DETAILED DESCRIPTION

Figure 1:
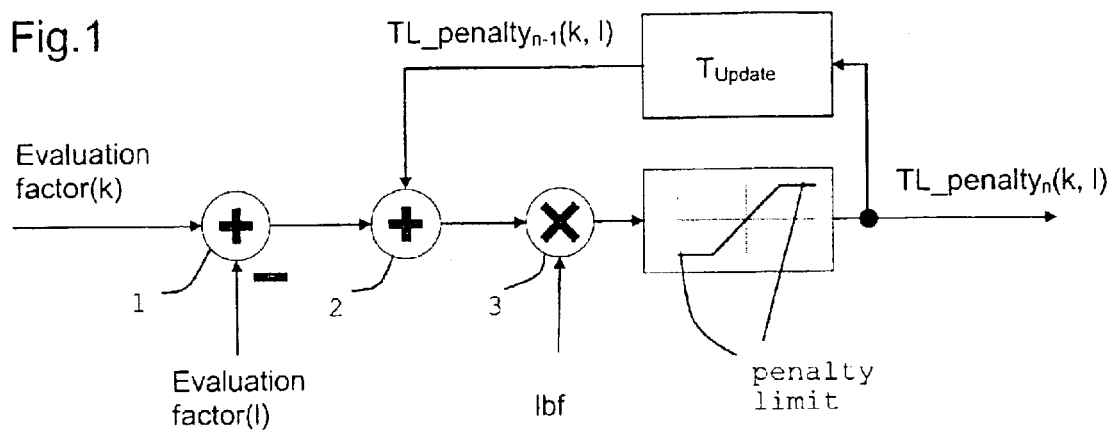
FIG. 1 is a schematic block diagram which displays the automatic control loop functionality of the invention.

According to the invention, first a universal mapping function $f_{Map}(N_{free})$ is introduced to map the traffic load into an evaluation factor or correction factor for the modified power budget handover. While the traffic load is measured in terms of the number of free traffic channels $N_{free}$, the evaluation or correction factor C applied to the power budget calculation for the handover threshold comparison and target cell ranking, which, will be explained in more detail below, is defined in units of dB. Thus the mapping functionality is given by $$C = f_{Map}(N_{free}).$$

The mapping function is discrete and has to be a monotonic decreasing function. Moreover, if no traffic channel is free, $N_{free}=0$, a maximum correction factor $C=C_{max}$ has to be assigned. Otherwise, if all available traffic channels are free $N_{free}=N_{ch}$, the correction factor has to be set to $C_n$, $C_n=0$ for simplicity. The term $N_{ch}$ denotes the total number of channels in the cell.

A possible solution to determine the correction or evaluation factor is to classify the current number of free channels $N_{ch}$ into one of n bands, whereby each band specifies a predefined correction or evaluation factor $C_i$. The bands are defined by a set of load thresholds $L_1 \ldots L_{n-1}$ representing the maximum number of free traffic channels for the corresponding band. The following notation is used:

$$[L_1, L_2, \ldots, L_{n-1}];$$

Furthermore, the relation $$[L_1, L_2, \ldots, L_{n-1}]; \; 0 \leq L_1 \leq L_2 \leq \ldots \leq L_{n-1}$$

must be fulfilled, where $L_0$ is usually set to zero. An evaluation factor $C_i$ is assigned to each of these traffic load bands. Similarly to the notation of the thresholds $L_i$ the following notation $$[C_1, C_2, \ldots, C_{n-1}];$$

is used. Furthermore, according to the convention above, the relation $$[C_1, C_2, \ldots, C_{n-1}]; \; C_1 \geq C_2 \geq \ldots \geq C_{n-1} \geq 0$$

must be valid, where $C_n$ is usually set to zero.

In the following, an example for the mapping function is given, which consists of two steps. First the threshold $L_i$ for the mapping into the traffic load bands can be calculated as $$L_i = \left[\left|(1 - S_{load}/100) \cdot \frac{i}{n-i}\right|\right] \cdot N_{ch}, \; \text{with } 1 \leq i \leq n-1,$$

where $S_{load}$ denotes percentage of the traffic load at which load balancing should start. Using the parameter settings $$N_{ch}=7, \; S_{load}=50\%, \; n=5$$

leads to the following thresholds $$L_1=0, \; L_2=1, \; L_3=2, \; L_4=3$$

or in vector notation [0, 1, 2, 3]

The following formula is used to determine the evaluation factors $$C_i = \left[(C_{max} - 0.1) \cdot \left(\frac{n-i}{n-1}\right)^a + 0.1\right], \; \text{with } 1 \leq i \leq n-1,$$

allowing different rises of the correction or evaluation factors by changing the parameter a. Using the parameter setting $$C_{max}=3 \text{ dB}, \; a=2, \; n=5$$

the following evaluation factors are obtained:

$$C_1=3 \text{ dB}, \; C_2=1.3 \text{ dB}, \; C_3=0.4 \text{ dB}, \; C_4=0.1 \text{ dB}$$

or in vector notation [3 dB, 1.3 dB, 0.4 dB, 0.1 dB]

The inventive method performs as follows:
First of all, every $T_{update}$ seconds, the current number of free traffic channels is determined for each cell. The more frequent the current load is updated, the better the method performs at the expense of an increased handover rate. The parameter $T_{update}$ depends on the traffic model (short or long calls). It should be smaller than the mean call duration. Furthermore, the following steps are performed afterwards:

The measured number of free traffic channels $N_{free}$ is mapped to one of the defined traffic load bands according to $$i=\{i | L_{i-1} \leq N_{free} < L_i\}, \; i=1 \ldots n,$$

where i runs from 1 to n until the condition above is fulfilled. After the above condition is fulfilled, the comparison is aborted and i determines the current traffic load band.

Based on the traffic load band l, the corresponding evaluation factor $C_i$ can be determined. This decibel (dB) value is a measure for the load on the current cell k (current evaluation factor C(k)). If the number of free traffic channels is larger than the value given by $L_{n-1}$, the value $C_n$ (usually 0) is assigned for the current evaluation factor.

The difference of the current evaluation factors between home cell k and its neighbor cell l is added to the traffic load penalty (evaluation factor applied to power budget calculation) from the previous step (TL_penalty $_{n-1}$(k,l)). Initially, the traffic load penalty TL_penalty$_0$(k,l) is set to 0 dB. The current value of the traffic load penalty (TL_penalty$_n$(k,l)) is obtained by multiplying by a load balancing factor lbf which is in the interval [0, 1]

$$TL\_penalty_n(k,l)=[TL\_penalty_{n-1}(k,l)+C(k)-C(l)] \cdot lbf$$

Using the method above for the calculation of the traffic load penalty, TL_penalty can reach very high values within long overload situations. Too high values of the traffic load penalty may cause quality problems due to interference. Therefore, the traffic load penalty is limited after every update period in the following way:

$$TL\_penalty_n(k, l) = \begin{cases} TL\_penalty\_limit & \text{for } TL\_penalty_n(k, l) > TL\_penalty\_limit \\ TL\_penalty\_limit & \text{for } TL\_penalty_n(k, l) < -TL\_penalty\_limit \end{cases}$$

A value of TL_penalty_limit=9 dB was used for the embodiments described herein.

After each update period of $T_{update}$ seconds the traffic load penalty is added to the power budget PBGT(k,l)(modified power budget) in the following way:

$$PBGT(k,l,(2 \cdot T_{update}))=PBGT(k,l,T_{update})+TL\_penalty_n(k,l,(2 \cdot T_{update}))$$

where RXLEV_NCELL(l) is the received signal level of the neighbor cell l and RXLEV_DL(k) is the receiving signal level of the current cell k in the downlink direction.

The determined traffic load penalties TL_penalty$_n$(k, l) for the neighboring cells are stored within the k-th cell data structure and used during power budget calculation and during neighbor cell ranking. The cell ranking gives the basis for a selection of the best cell to be used for the handover.

This algorithm works somewhat like an automatic control loop. This can be best understood in connection with FIG. 1. As shown there, the previously calculated traffic load penalty TL_penalty(k,l) is used to calculate the current TL_penalty factor. Thus, generally free selectable evaluation factors C(k) and C(l), which are combined into a comparing factor at point 1, are added to the forerunner penalty factor at point 2. This result is multiplied with the load balancing factor lbf at point 3, which can be freely chosen in the interval [0, 1]. Moreover, FIG. 1 shows that the size of the penalty factor is limited to a lower and an upper limit as described above.

Figure 2:
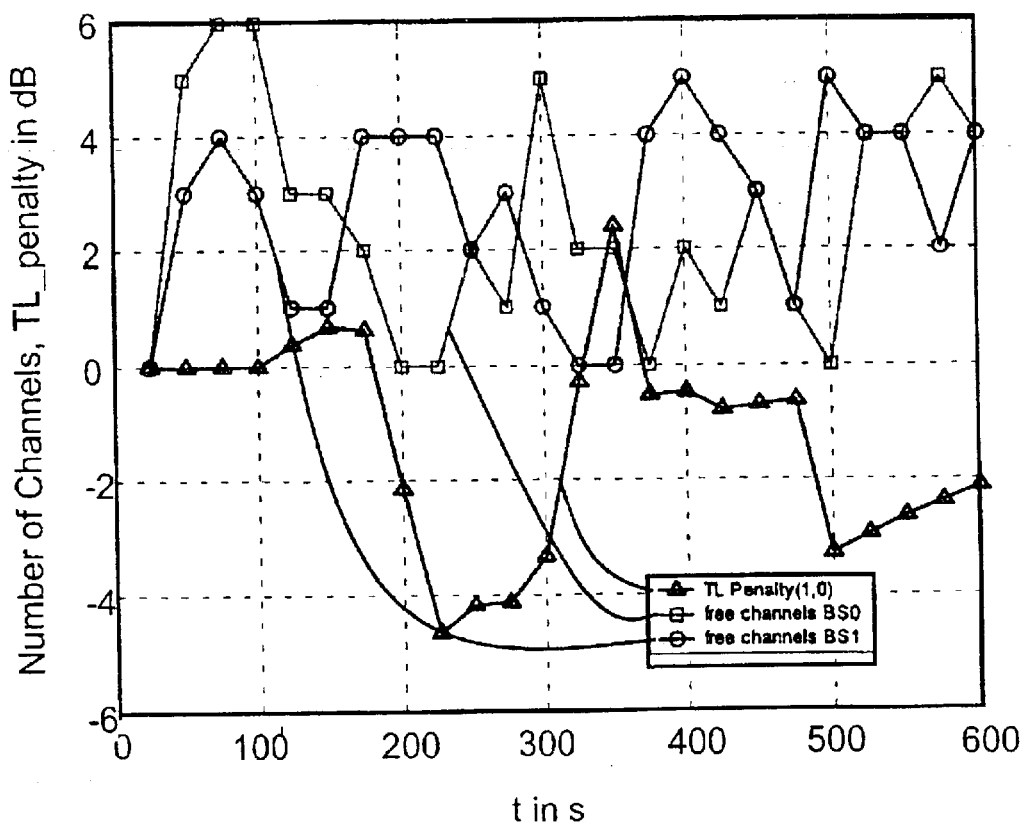
FIG. 2 shows dynamic behavior of the proposed method by way of examples, wherein the current traffic load penalty factor and the number of free channels are displayed as a function of time.

The diagram of FIG. 2 displays the dynamic behavior of the proposed algorithm, when the following parameters are used:

$T_{update}$=25 seconds thresholds [0, 0, 1, 1]

evaluation factors [3 dB, 1.3 dB, 0.4 dB, 0.1 dB]

The load balancing factor lbf was set to 0.9, which was found to be a good compromise between the reduction of the blocking probability and the increase of the number of handovers and the chosen load update interval $T_{update}$. Furthermore, the number of free channels of two neighboring base stations (k, l) as well as the resulting traffic load penalty TL_penalty(k,l) are shown.

It can be observed in FIG. 2 that at the start of the method, as long as the number of free channels at the base stations BS0 and BS1 is greater than 1, the penalty factor, TL_penalty, is zero, because TL_penalty$_0$(k,l) is preset to zero which is also the case for C(k=0) and C(l=1) in case the number of free traffic channels is larger than any of the above-defined thresholds or bands. The value of TL_penalty first starts to increase when the number of free channels of BS1 reduces to one, whereby at the base station BS0, there are still more than one, namely three, channels free. For determining the load penalty the proposed method checks upon the condition $$C=\{C_i|L_{i-1} \leq N_{free} < L_i\}, \; i=1 \ldots n,$$

which evaluation factors for each cell or base station has to be chosen. Since the number of free channels at base station BS0 is still higher than that of any of the defined bands, the evaluation factor is set to zero. Since base station BS1 has only one free channel, which corresponds to the value of the third of four bands, the method takes the third threshold and assigns it to the third evaluation factor C(k=1)=0.4 dB from the defined set of evaluation factors. Thus the traffic load penalty is 0.4 dB*0.9=0.36 dB.

This value for the load penalty is essentially applied except for a slight reduction because of the multiplication with the load balancing factor over some periods, i.e. for three periods starting at 100 s. Thus, a process with memory is obtained. However, although the method memorizes former penalty factors, it reacts fast enough to counter steer if the situation reverses. This can be seen at the penalty factor update made at 200 s. It can be seen that there are no free channels at the base station BS0, but four free channels at the base station BS1. In consequence, the traffic load penalty is calculated such that its forerunner is overcompensated and decreased from a value of 0.62 dB to −2.15 dB.

Figure 3:
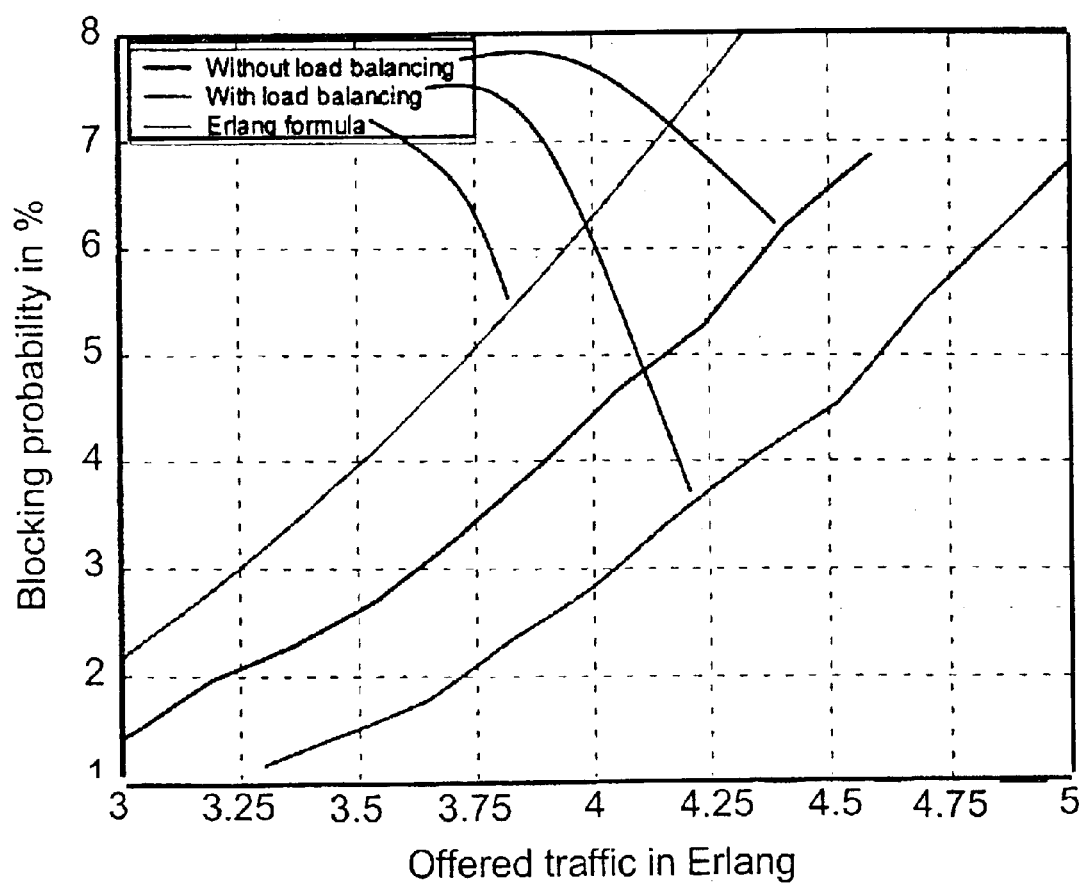
FIG. 3 shows blocking probability as a function of the offered traffic, wherein the blocking probability with load balancing according to the invention is compared to the Erlang-B formula and to a reference network without load balancing.

FIG. 3 show the blocking capability as a function of the offered traffic. Three scenarios are shown: (1) the theoretical result according to the Erlang-B formula:

$$p_{bl} = \frac{\rho/c!}{\sum_{i=0}^{c} \rho^i/i!}$$

where $\rho$ is the offered traffic, $N_{ch}$ is the number of traffic channels and $p_{bl}$ is the blocking probability; (2) the blocking probability if no load balancing is used; and (3) the situation when the inventive method for load balancing is applied.

The used simulation scenario is specified as follows:
4 sites and 12 cells (3 sectors per site)
cell radius R=1000 m (edge length) of the hexagonal cells
single TRX with 7 traffic channels per cell using one out of 12 frequencies
wrap around scenario ensuring a homogeneous cell layout and interference situation
shadow fading standard deviation: 7 dB, correlation length: 200 m
mean velocity of the users: 15 km/h
queuing time of 4 seconds for traffic channel assignment
mean call duration: 110 seconds
simulation time: 18000 seconds (or 5 hours)
thresholds [0, 1, 2, 3] which implies that the intelligent load balancing starts, if more than 50% of the channels are occupied
evaluation factors [3 dB, 1.3 dB, 0.4 dB, 0.1 dB].

As can be seen from FIG. 3, the blocking probability for the scenario without intelligent load balancing is smaller than the theoretical one, because mobility and queuing balances the traffic load. By comparing the curves (blocking probability vs. offered load) for the network with and without load balancing, an average gain of the inventive method in offered load of about 0.5 Erlang can be observed to reach the same blocking probability as without load balancing. Thus, the percental gain in offered traffic increases with lower blocking probability.

Figure 4:
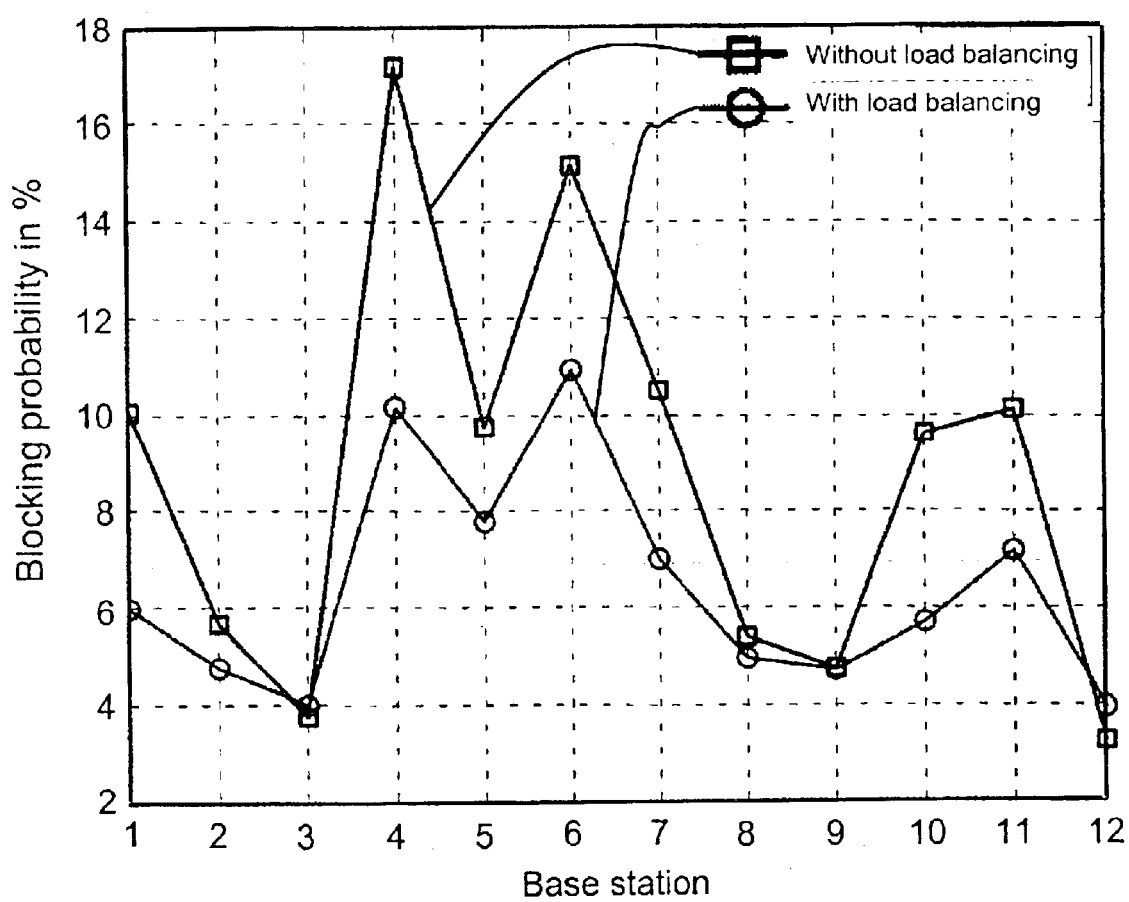
FIG. 4 shows blocking probability for different base stations for a hot spot scenario.

In FIG. 4 the blocking probability is shown per base station for a hot spot scenario, which is based on the simulation scenario introduced above. These results indicate that the inventive handover method equalizes the blocking probabilities between the different cells to some extent. The inventive method significantly reduces the blocking probability in highly loaded cells and charges the lightly loaded cells leading to a better traffic balancing. This effect reduces the average blocking probability over all cells. Thus the traffic carried by the system can be increased significantly. The increased carried traffic indicates the capacity gain due to the equalization of the load in the cells, which has been addressed by the inventive method.

Thus far in the following table the capacity gain and the increase of the numbers of handovers (HO) assuming the same blocking probability as without the inventive or intelligent load balancing is depicted.

| Blocking Probability | Capacity gain [%] | 95% Confidence interval [%] | Increase HO [%] | 95% Confidence interval [%] |
|---|---|---|---|---|
| Homogeneous scenario | | | | |
| 2% | 14.59 | 14.35–14.83 | 27.02 | 26.48–27.56 |
| 7% | 9.86 | 9.58–10.15 | 23.62 | 23.11–24.13 |
| Hot spot scenario | | | | |
| 9% | 11.38 | 11.19–11.57 | 27.89 | 27.48–28.29 |

It is shown that the proposed method offers a capacity gain of nearly 15% at a blocking probability of 2%. At an increased blocking probability (about 7%) the gain is lower (nearly 10%). On the other hand, the number of handovers is slightly increased, but always lower than 30%. In a hot spot scenario the capacity gain of the proposed method is much higher, reaching 12% at a blocking probability of about 9%. Thus the inventive method is especially favorable, if applied in so-called hot spot scenarios.

We claim:
1. A method for communication traffic load balancing between cells of a communication system which are differently loaded comprising the following steps:
   a) determining an evaluation factor by a predefined mapping function for a home cell k and for at least one other cell l, the evaluation factor being a measure of the load on the respective cells,
   b) determining at least one comparing factor with respect to said home cell evaluation factor by calculating the difference between the evaluation factor of the home cell and at least one other cell,
   c) assigning each of said comparing factors to corresponding traffic load penalty factors, the traffic load penalty factors being a measure of load difference and/or transmission quality between the cells k and l, wherein the assignment is repeated in a loop comprising the steps a) to b) and wherein current traffic load penalty factors are determined depending on predefined traffic load penalty factors and/or forerunner traffic load penalty factors determined in earlier cycles of the loop, and d) evaluating on the basis of the current traffic load penalty factors, unused transmission capacity of a cell and/or cells in comparison to the home cell and/or a time at which at least a part of the traffic of the home cell is handed over to at least one cell with unused capacity.

2. The method according to claim 1, wherein the mapping function maps free traffic resources in terms of free traffic channels $N_{free}$ into a discrete and monotonic function.

3. The method according to claim 1, wherein the evaluation factor is determined for a cell by classifying the current number of free channels ($N_{ch}$) into one of n bands, whereby each band specifies a predefined evaluation factor ($C_i$), the bands are defined by a set of load thresholds ($L_1 \ldots L_{n-1}$) representing the maximum number of free traffic channels for the corresponding band, and the load thresholds and the evaluation factors fulfill the following conditions:

$$[L_1, L_2, \ldots L_{n-1}]; \ 0 \leq L_1 \leq L_2 \leq \ldots \leq L_{n-1}$$

$$[C_1, C_2, \ldots C_{n-1}]; \ C_1 \geq C_2 \geq \ldots \geq C_{n-1} \geq 0$$

whereby the evaluation factor is selectively mapped from the set of evaluation factors in dependence on the number of current free channels ($N_{free}$) corresponding to a band ($L_i$) of free traffic channels.

4. The method of claim 3 wherein $L_0$ and $C_n$ are set to zero.

5. The method according to claim 3, wherein the evaluation factor of a cell is determined on the basis of the following equations:

$$C_i = \left[(C_{max} - 0.1) \cdot \left(\frac{n-i}{n-1}\right)^a + 0.1\right], \text{ with } 1 \leq i \leq n-1,$$

wherein $L_i$ is determined by the equation:

$$L_i = \left[\left|(1 - S_{load}/100) \cdot \frac{i}{n-i}\right|\right] \cdot N_{ch}, \text{ with } 1 \leq i \leq n-1,$$

wherein $S_{load}$ denotes the percentage of the traffic load bands, $N_{ch}$ the total number of traffic channels in the cell and $C_{max}$ the maximum evaluation factor, and whereby the evaluation factor is selectively mapped from the set of evaluation factors in dependence on the number of current free traffic channels ($N_{free}$) corresponding to a band ($L_i$) of free traffic channels.

6. The method according to claim 5, wherein the evaluation factor is selectively mapped by determining an appropriate i-value for a corresponding evaluation factor according to the following condition $$i = \{i | L_{i-1} \leq N_{free} < L_i\}, \ i=1 \ldots n.$$

7. The method according to claim 5, wherein the current traffic load penalty factors ($TL\_penalty_n(k, l)$) between two cells is determined recursive from the following equation:

$$TL\_penalty_n(k,l) = [TL\_penalty_{n-1}(k,l) + C(k) - C(l)] \cdot lbf$$

wherein lbf is the load balancing factor.

8. The method according to claim 7, wherein the traffic load penalty factors are limited according to the following term:

$$TL\_penalty_n(k, l) = \begin{cases} TL\_penalty\_limit & \text{for } TL\_penalty_n(k, l) > TL\_penalty\_limit \\ -TL\_penalty\_limit & \text{for } TL\_penalty_n(k, l) < -TL\_penalty\_limit \end{cases}$$

9. The method according to claim 7, wherein the time of handover is determined in connection of a power budget (PBGT(k,l)) between the home cell k and at least one other cell l which is determined according to the following equation:

$$PBGT(k,l,(2 \cdot T_{update})) = PBGT(k,l,T_{update}) + TL\_penalty_n(k,l,(2 \cdot T_{update})),$$

where the traffic load penalty $TL\_penalty_n(k,l)$ is added to the power budget leading to a modified power budget.

10. Apparatus, comprising:

means for determining an evaluation factor by a predefined mapping function for a home cell k and for at least one further cell l, the evaluation factor being a measure of the load on the respective cells, means for determining at least one comparing factor with respect to said home cell evaluation factor by comparing the evaluation factor of the home cell with those of the at least one other cell, means for assigning each of said comparing factors to corresponding traffic load penalty factors, the traffic load penalty factors being a measure of load difference and/or transmission quality between the cells k and l, whereby the assignment is repeated in a loop comprising the time-dependent determination of the evaluation factor and the comparing factor, wherein current traffic load penalty factors are determined depending on predefined traffic load penalty factors k, l and/or forerunner traffic load penalty factors k, l ($TL\_penalty_{n-1}(k, l)$) determined in earlier cycles of the loop, means for evaluating on the basis of the current traffic load penalty factors, unused traffic capacity of a cell and/or cells in comparison to the home cell and/or a time at which at least a part of the traffic of the home cell is handed over to at least one cell with unused capacity.

* * * * *